March 31, 1931.  W. C. AMES  1,798,245
MOLDING
Filed Aug. 11, 1928
Fig. 1.
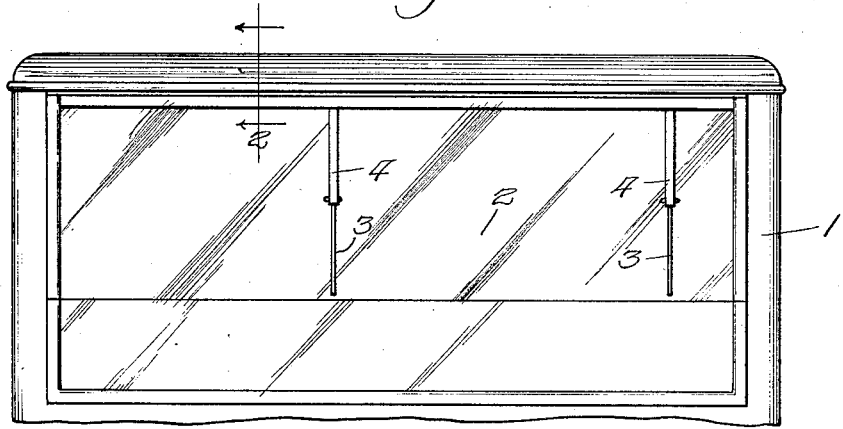
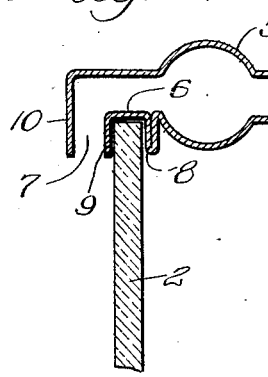
Fig. 2.
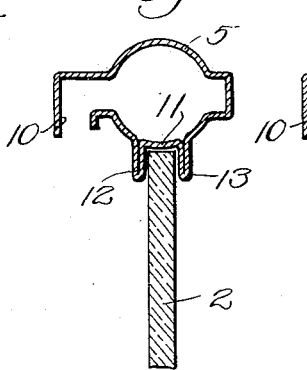
Fig. 3.
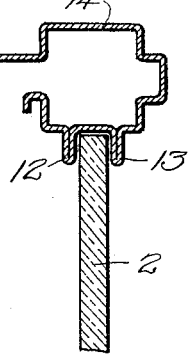
Fig. 4.
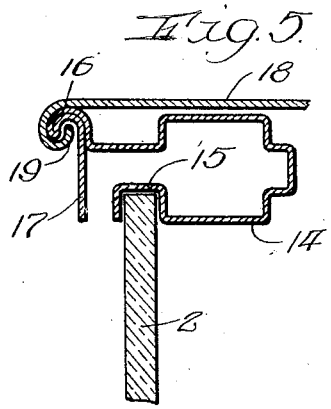
Fig. 5.
Inventor
W. C. Ames,
By Wallace R. Lane.
Atty.

Patented Mar. 31, 1931

1,798,245

UNITED STATES PATENT OFFICE

WARREN C. AMES, OF NILES, MICHIGAN, ASSIGNOR TO THE KAWNEER COMPANY, OF NILES, MICHIGAN, A CORPORATION OF MICHIGAN

MOLDING

Application filed August 11, 1928. Serial No. 298,933.

This invention relates to moldings and more particularly to a construction of molding adapted for automobile use, the exterior thereof providing a groove for the retention of the upper end of a windshield and the interior of the molding being adapted to house a windshield wiper.

Among the objects of my invention are to provide a molding formed of sheet metal, which has the dual function of housing windshield wipers, and also providing a retaining means for the upper edge of the windshield; further to provide a novel construction of metal molding which prevents any damage to the mechanism of the windshield wipers which are housed within the molding or windshield tubing; further to provide a construction of maximum strength and durability; further to provide an apparatus of maximum simplicity, efficiency, economy and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 1 is a fragmentary view in front elevation of the upper portion of an automobile, showing the application of my novel construction of molding.

Fig. 2 is a vertical cross-sectional view through the molding shown in Fig. 1, and taken on the line 2—2 thereof.

Figs. 3 and 4 are vertical cross-sectional views through alternate forms of moldings.

Fig. 5 is a vertical cross-sectional view of a further alternate construction of molding, the molding in this form being provided with a hinged sector.

Referring to the drawings, the numeral 1 designates generally the body of an automobile having the usual windshield 2. A pair of windshield wipers 3, 3 are mounted so that each wiper operates over one-half the width of the windshield. The two wipers working in conjunction will keep substantially the entire windshield free from rain, snow or ice, thus allowing continuous clear vision throughout the entire width of the windshield. Each of the wipers are mounted upon arms or standards 4, 4 for operating over the surface of the windshield.

In order to allow free longitudinal movement of the arms or standards 4, 4, I provide a novel construction of molding, which not only allows free movement of said standards, but also provides a housing for the windshield wipers and also a glass holding or retaining means for the windshield.

As disclosed in the figures, the molding is constructed of an integral section of sheet material and provides an opening for the standards 4, 4 to extend into, a housing for the windshield wipers, and a retaining means for the windshield.

The construction disclosed in Fig. 2 contemplates a cylindrically extending portion 5 adapted to house the mechanism for the windshield wipers, a glass retaining means 6, and a longitudinally extending opening 7 for passage of the standards or arms 4, 4. The glass retaining means 6 includes a portion of the molding bent upon itself to form a flange 8, while the edge of the molding provides a flange 9, these two flanges providing a backing or retaining means for the windshield. The upper portion of the molding is provided with a downwardly extending flange 10, which besides housing the upper end of the standards or arms, also provides a shield or cover for preventing access of rain or other foreign material into the molding or housing.

Fig. 3 discloses a slightly modified construction of molding, the lower portion of the molding being bent upon itself to form a glass retaining means 11, having a pair of downwardly extending flanges 12 and 13.

Fig. 4 discloses a construction similar to that shown in Fig. 3 with the exception of a rectangular, longitudinally extending housing 14, in place of the cylindrically extending housing 5 disclosed in Figs. 2 and 3. The configuration of the longitudinally extending housing depends upon the shape of the windshield wiper mechanism, the rectangular or cylindrical housing being adapted to support and protect substantially any make of windshield wiper that is being used.

Fig. 5 discloses a novel construction of molding having a rectangularly extending housing 14, a glass holding means 15 on its lower surface, and its upper surface being bent upon itself to provide a longitudinally extending curved portion 16, the free end thereof being bent downwardly to provide a flange 17. A hinged strip 18, adapted to be attached to the body of the automobile, is provided on its outer edge with a downwardly and rearwardly curved portion 19. This portion 19 is adapted to intercept the curved portion 16 which fits therein, the two curved elements forming a hinge for allowing a swinging movement of the molding and windshield. The curved portions 16 and 18 are in continuous surface contact throughout their length, the portion 16 being capable of a given amount of rotary or swinging movement within the portion 18, as well as being also capable of sliding movement therein, the ends of the portion 18 being open for the purpose.

From the above description, it will readily be seen that I have provided a new and novel construction of molding that will not only take care of the windshield but of the windshield wipers as well. Any number of wipers may be used, depending upon the amount of surface of the windshield that is desired to be cleared. The molding is constructed of sheet material and is very rigid and durable. Since the ends of the molding are open, it is a simple matter to insert or withdraw the wiper mechanism from its support in the molding, and there is no possibility of any foreign material entering the molding and damaging the wiper mechanism. It will thus be seen that I have provided a construction which will obviate the difficulties and disadvantages of the present type of windshield wiper.

Having thus disclosed my invention, I claim:

The combination with a hinge member on the body of an automobile, of a molding comprising a sheet of metal bent to form a housing for a windshield wiper mechanism, the lower portion of said molding being formed to receive an edge of a windshield, the upper portion thereof being bent upon itself to provide a longitudinally extending curved portion forming a hinge member adapted to engage the hinge member on the body of the automobile to allow for a swinging movement of said molding and windshield, and a flange, said flange and the lower portion of the molding providing an elongated slot for permitting movement of the windshield wiper over the surface of the glass.

In witness whereof, I hereunto subscribe my name to this specification.

WARREN C. AMES.